C. STRAUSS.
SAWING MACHINE.
APPLICATION FILED JULY 12, 1912.
1,126,312.
Patented Jan. 26, 1915.
4 SHEETS—SHEET 3.
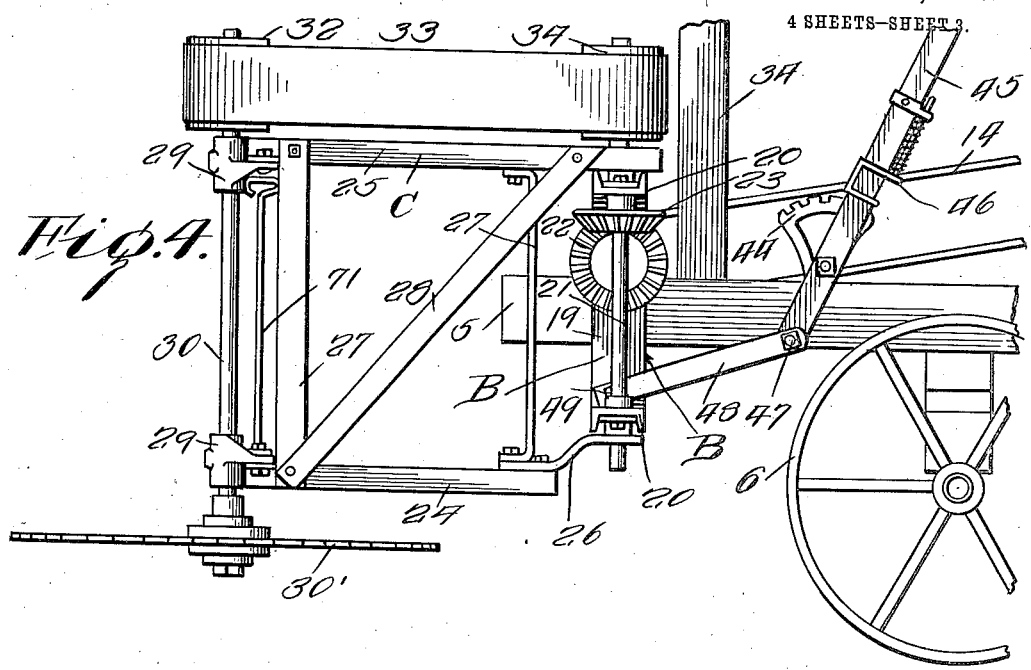
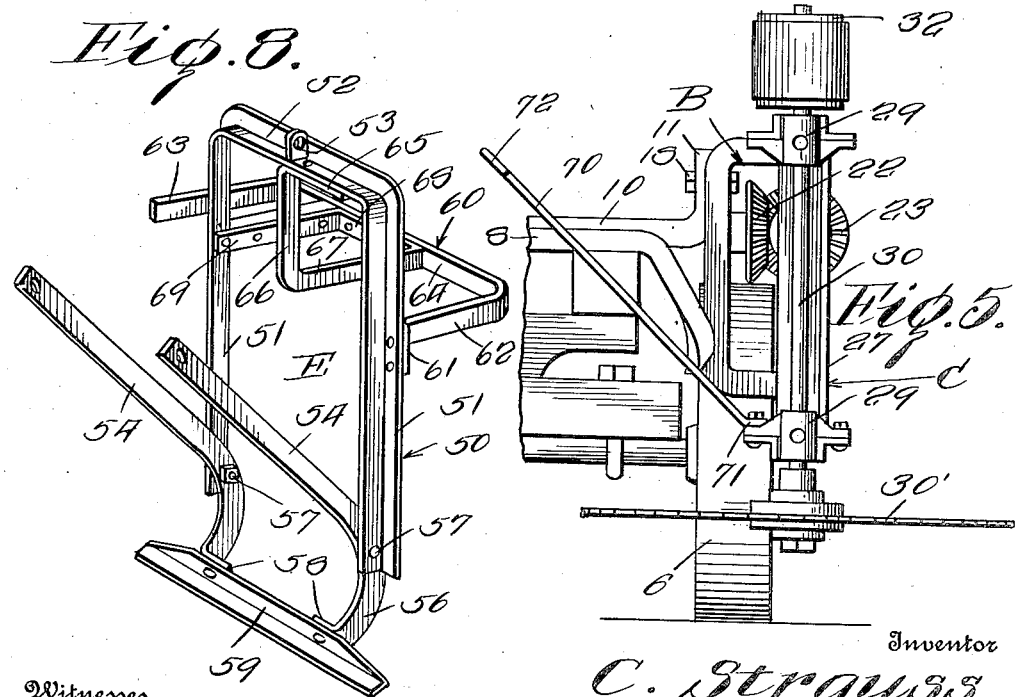
Inventor
C. Strauss
By Candlee & Candlee
Attorneys
Witnesses
B. E. Bram
George Salv

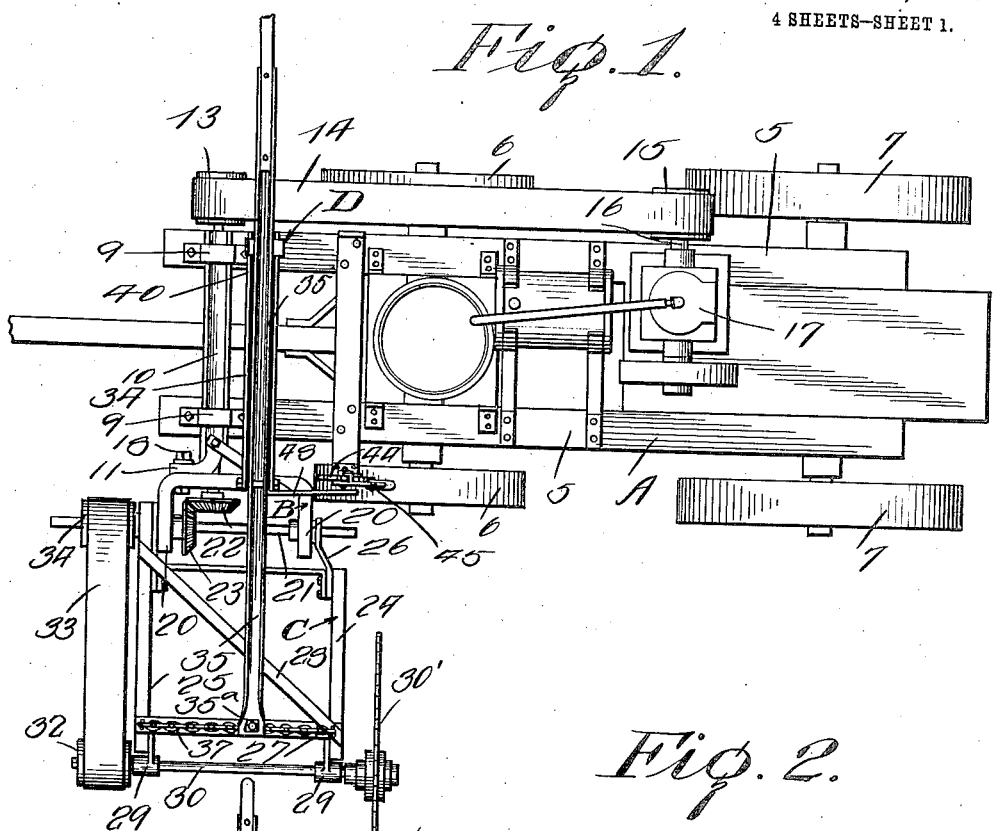

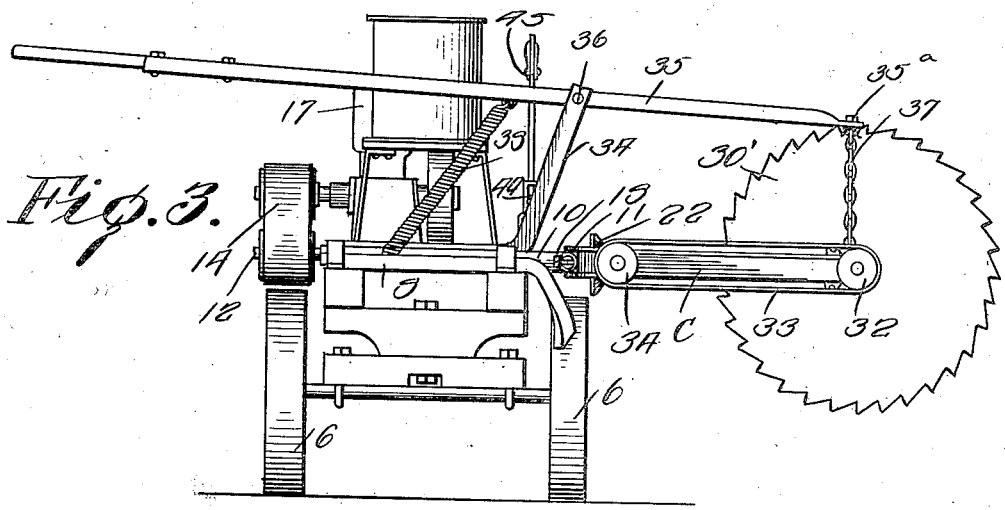
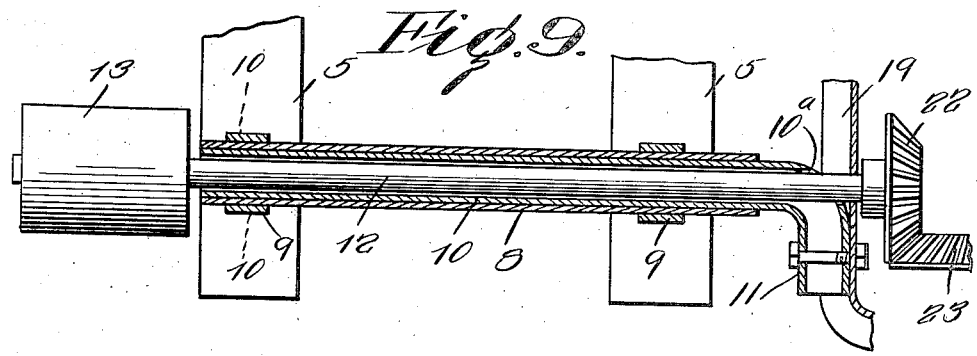
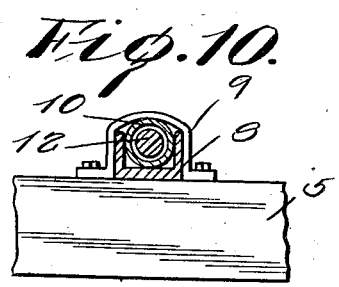
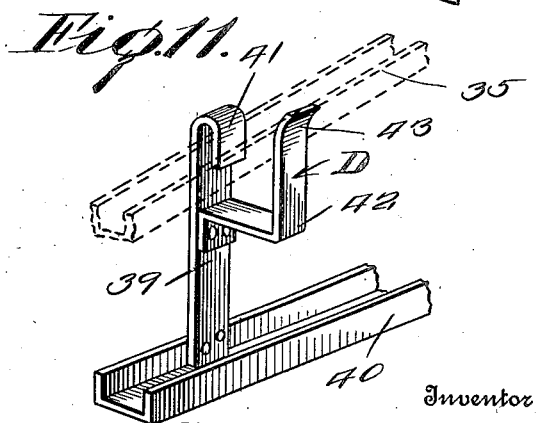

C. STRAUSS.
SAWING MACHINE.
APPLICATION FILED JULY 12, 1912.

1,126,312.

Patented Jan. 26, 1915.
4 SHEETS—SHEET 4.

Witnesses

Inventor
C. Strauss
By Chandlee & Chandlee
Attorneys

UNITED STATES PATENT OFFICE.

CARL STRAUSS, OF HERINGTON, KANSAS.

SAWING-MACHINE.

1,126,312.  Specification of Letters Patent.  Patented Jan. 26, 1915.

Application filed July 12, 1912. Serial No. 708,990.

*To all whom it may concern:*

Be it known that I, CARL STRAUSS, a citizen of the United States, residing at Herington, in the county of Dickinson, State of Kansas, have invented certain new and useful Improvements in Sawing-Machines; and I do hereby declare the following to be a full, clear, and exact description of the invention, such as will enable others skilled in the art to which it appertains to make and use the same.

This invention relates to improvements in sawing machines.

The principal object of the invention is to provide a sawing machine by means of which logs may be readily sawed while lying upon the ground, or while supported on the saw-horse, or for sawing down trees.

Another object of the invention is to provide a sawing machine which includes a pivoted saw frame for permitting the saw to be positioned at any desired angle.

Another object of the invention is to provide a novel means for manually holding the saw at any elevation.

A further object of the invention is to provide a sawing machine in which there is provided a novel means for locking the saw in its elevated position away from the work.
A still further object of the invention is to provide a sawing machine of the character described which is composed of a relatively few number of parts, is therefore simple in construction, is easy of operation, and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

Figure 6:
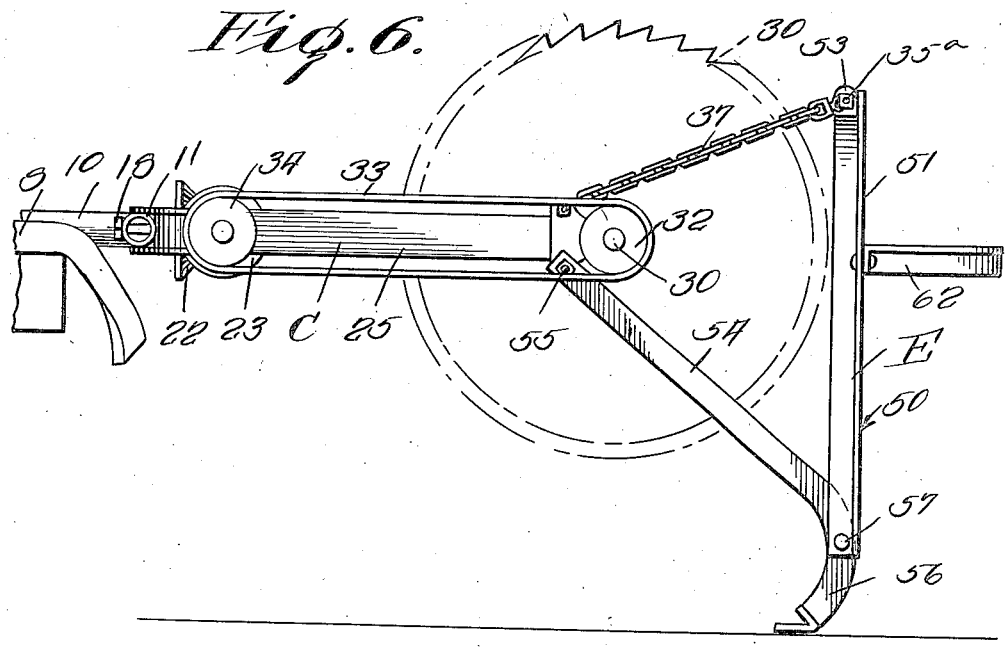
Figure 7:
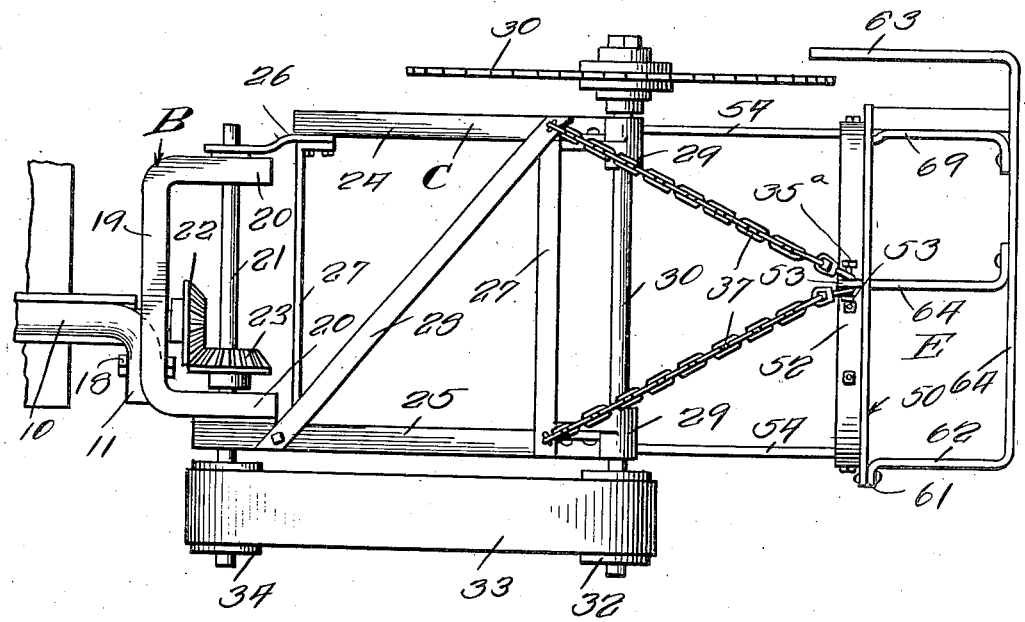

In the drawings: Figure 1 is a top plan view of a sawing machine constructed in accordance with my invention, the view showing the saw disposed in a vertical plane, Fig. 2 is a side elevation thereof, Fig. 3 is an end view of the same, Fig. 4 is a detail side elevation showing the saw disposed in a horizontal plane, Fig. 5 is an end view thereof, Fig. 6 is an end elevation showing the sawing frame supported upon a saw-horse, Fig. 7 is a top plan view thereof, Fig. 8 is a perspective view of the saw-horse, Fig. 9 is a
detail horizontal sectional view showing the bearing for the saw frame and the driving means for the saw, Fig. 10 is a detail cross sectional view taken on the line 10—10 of Fig. 9, and Fig. 11 is a detail perspective view showing the means employed for locking the saw-frame supporting lever in its locked position.

Like reference numerals designate corresponding parts in all the figures of the drawings.

Referring to the drawings, the invention comprises a main frame A which includes spaced longitudinal sills 5—5 and which is supported upon front and rear ground wheels 6 and 7 respectively, the sills extending in advance of the front wheel 6. Disposed upon the sills 5 in advance of the front wheel 6 is a transversely disposed channel iron 8 which is held in fixed relation to said sills by means of inverted U-shaped clips 9. Mounted within the channel iron 8 for oscillatory movements, is a tube 10, one end 11 thereof being bent at right angles. Loosely mounted within the tube 10 is a drive shaft 12, and on the end thereof opposite the end 11 of the tube 8 is fixed a pulley 13 which is driven by a belt 14 from a pulley 15 mounted on the crank shaft 16 of a motor 17.

The end 11 of the tube 10 is connected by means of bolts 18 or the like to the connecting portion 19 of a U-shaped frame B, the legs 20—20 of said frame being formed with suitable openings for receiving a shaft 21. The connecting portion 19 of the frame is formed with an opening for receiving the adjacent end of the drive shaft 12, said shaft passing through an opening 10ª formed in the angle of the tube 10, and fixed on the projecting end thereof and within the frame B is a beveled pinion 22 which meshes with a beveled pinion 23 fixed on the shaft 21.

The shaft 21 extends beyond the legs 20 of the frame B, and constitutes a pivot for a saw-supporting frame C. This frame includes spaced sides bars 24 and 25 respectively, the latter being longer than the former and having pivotal connection with said shaft 21. Connected to the inner end of the bar 24 is a plate 26, and this plate is pivotally connected with said shaft 21, the bar 25 and plate 26 being disposed beyond the legs 20 of the frame B. The bars 24 are held in spaced relation by means of transverse frame members 27—27, and are held against relative movement by means of a diagonal brace 28.

Secured to the outer ends of the bars 24 and 25 are bearings 29—29, and in these bearings is loosely mounted a transversely disposed saw arbor 30. The ends of the arbor extend beyond the arms 24 and 25, and carried by that end of the arbor adjacent the bar 24 is a circular saw 30'. Fixed on the other end of the arbor 30 is a pulley 32 which is driven by a belt 33 from a pulley 34 which is fixed on the adjacent end of the shaft 21. It will thus be observed that motion is transmitted from the crank shaft 16 of the motor 17 through the medium of the belt 14 to the drive shaft 12, thence through the medium of the beveled pinions 22 and 23 to the shaft 21, thence by means of the belt 33 to the saw arbor 30.

Extending upwardly from the forward end of the main frame A is a standard 34, and a transversely disposed lever 35 formed of channel iron is fulcrumed intermediate its ends upon the upper end of the standard 34, as indicated by the reference numeral 36. The forward end of the lever 35 is formed with an opening for receiving a bolt 35ª, and this bolt is connected by the inner ends of chain sections 37—37, the outer ends of said chain sections being suitably connected to the outer ends of the side bars 24 and 25 of the saw frame C. A coil spring 38 has one end connected to the main frame A of the machine, and the other end to the long arm of the lever 35 and serves to yieldably retain the saw-frame C in an elevated position.

In order to lock the saw-frame C in an elevated position, the long arm of the lever 35 is depressed and is engaged with a locking element D. This element consists of a post 39 which extends upwardly from a transverse channel member 40 of the main frame A, and has its upper end inwardly bent to form a hook 41. A guide element 42 has one end fixed to the post 39 below the hook 41, and has its free end bent upwardly in spaced relation to the hook 41 and terminates in an outwardly directed guide finger 43. The lever 35 is directed between the hook 41 and the guide finger 43, and thence below the hook 41 to the position shown in Fig. 11 of the drawings.

Fixed upon the side sill 5 of the main frame A in rear of the standard 34 is a quadrant 44, and pivoted upon said quadrant is a hand lever 45 having a spring actuated pawl 46 of any suitable construction carried thereby and engageable with said quadrant to hold the lever in any adjusted position. Pivoted to the lower end of the lever, as at 47, is one end of a link 48, the other end of said link being pivotally connected, as at 49, to the connecting portion 19 of the frame B. By means of this lever 45 and link 48, the frame B may be held in any adjusted or inclined position as will be readily observed from an inspection of Fig. 4. It is to be noted that when the saw 30' is disposed in a horizontal plane, as is shown in Fig. 4, the connecting portion 19 of the frame B is disposed in a vertical plane, but when the saw 30' is disposed in a vertical plane, as is shown in Figs. 1, 2 and 3, the connecting portion 19 will be disposed in a horizontal plane. In the last mentioned position of the frame B, the outer end of the link 48 is detached from the lower end of the lever 45 and is connected to said lever above its pivot.

My invention further comprises a saw horse which is designated as a whole by the reference letter E, and this horse is adapted to be connected to the saw-frame C when said frame is disposed in its horizontal position, as is shown in Figs. 6 and 7. This horse consists of an inverted U-shaped frame 50 of angle iron which includes legs 51—51 and a connecting portion 52. Centrally attached to the connecting portion 52 is an eye 53. The bolt 35ª of the lever is detached from said lever and is positioned within the eye 53, and the inner ends of the chain sections 37 are thence engaged with the bolt, and thereby serve to retain the upper end of the frame 50 in proper relation with respect to the saw 30'. A pair of brace rods 54—54 are each connected at their upper ends, as at 55, to the outer end of the saw frame C. The lower ends of these bars curve downwardly, as at 56—56, and have pivotal connection with the lower ends of the legs 51 by means of bolts 57. The lower ends of the rods 54 are inwardly bent to form attaching flanges 58—58, and secured to these flanges is a foot 59 which is formed from angle iron. Secured to the frame 50 and extending outwardly therefrom is a table 60. This table includes a U-shaped frame having one end 61 connected to one leg 51. The table frame includes spaced legs 62—63 and a connecting portion 64, the leg 63 being disposed beyond the saw 30'. A brace has one end 65 secured to the underface of the connecting portion 52 of the frame 50. This brace thence extends downwardly, as at 66 and thence outwardly as at 67 in the same plane as the table 60, the portion 67 forming a central support for the table frame. The portion 67 of the brace is then bent laterally, as at 68, and is secured to the connecting portion 64 of the table frame, the end portion of said brace thence being bent rearwardly, as at 69, and has its end secured to the leg 51 of the frame 50, the portion 69 also forming a support for the table frame.

When it is desired to employ the machine for cutting logs upon the ground, the saw frame C is positioned as is shown in Figs. 1, 2 and 3 of the drawings. The saw 30 is held in a vertical plane by means of the lever 45 and link 48 as above described. When it is desired to elevate the saw-frame C so as to position another log, the free end of the handle 35 is depressed and is engaged with the lock D as above described. In this position, the operator can readily place the log in proper position below the saw 30'.

When it is desired to employ the machine for cutting down trees, the saw frame is swung to the position as shown in Figs. 4 and 5 of the drawings. In this position the lever 35 is of course disengaged from the chains 37. In order to swing the saw into the cut, there is provided a rearwardly extending push rod 70 which is connected at one end to the saw-frame C, as at 71, and is provided with a handle 72 at its other or free end.

When it is desired to cut cord wood into stove lengths, the saw-horse E is attached to the saw frame as above described and as is clearly shown in Figs. 6 and 7 of the drawings. When the saw-horse is thus used, the cord wood is positioned upon the table 60 and as the saw feeds into the wood, the frame 50 is swung inwardly upon its pivots 57 toward the saw, as will be readily understood.

What is claimed is:

1. In a sawing machine, the combination with a main frame, of an open ended tube supported thereon for axial rotation and having one end bent laterally, said tube being formed at its angle with an opening, a driven shaft loosely mounted in the tube and having one end projecting outwardly through the opening thereof, a frame swingingly mounted upon the projecting end of the shaft and having fixed connection with the lateral end of the tube, a saw frame swingingly connected to the first mentioned frame, and a driving connection between the shaft and saw.

2. In a sawing machine, the combination with a main frame, of an open ended tube supported thereon for axial rotation and having one end bent laterally, said tube being formed at its angle with an opening, a driven shaft loosely mounted in the tube and having one end projecting outwardly through the opening thereof, a frame swingingly mounted upon the projecting end of the shaft and having fixed connection with the lateral end of the tube, a shaft journaled in said swinging frame and having operative connection with the driven shaft, a saw frame swingingly connected to the first mentioned frame, a saw carried by the last mentioned frame, and a driving connection between the last mentioned shaft and the saw.

In testimony whereof, I affix my signature in presence of two witnesses.

CARL STRAUSS.

Witnesses:
F. H. CLARKE,
E. L. HART.